United States Patent Office 3,486,773
Patented Dec. 30, 1969

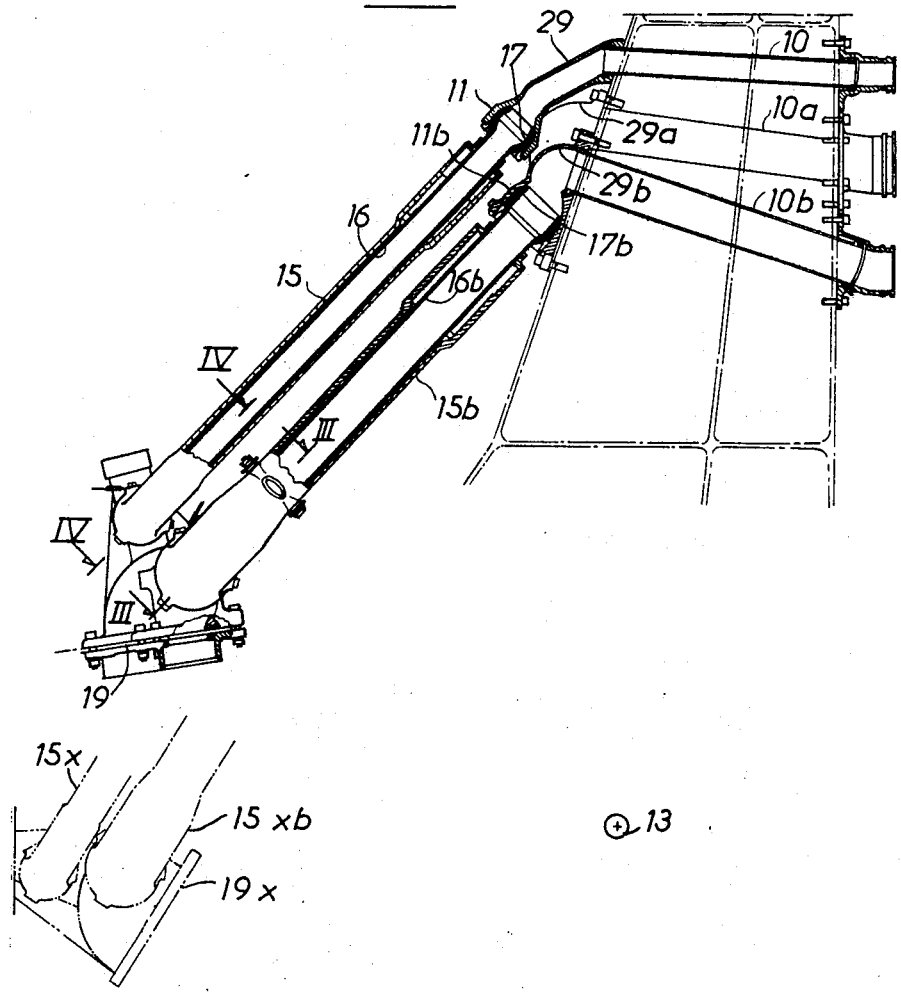

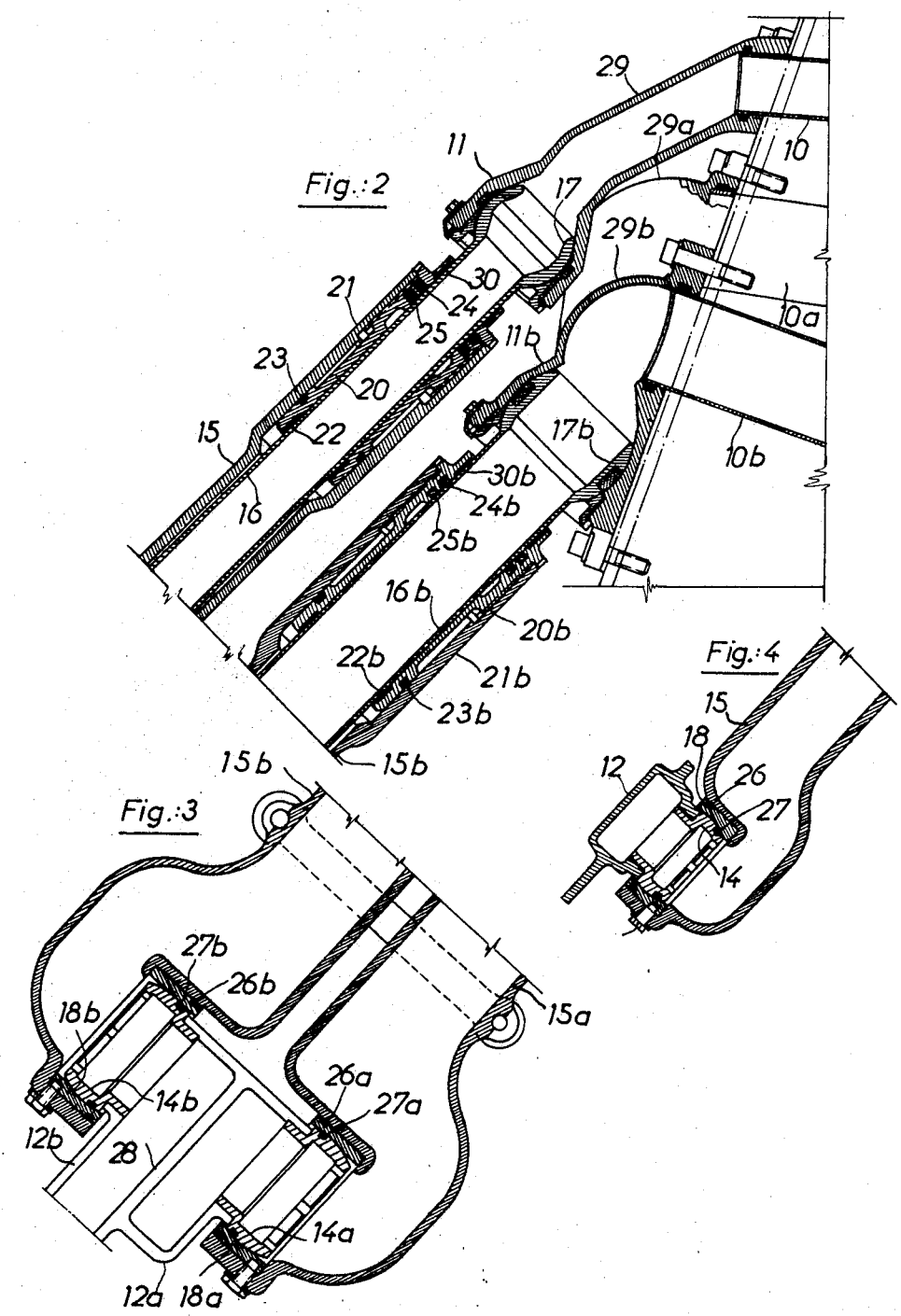

3,486,773
ARTICULATED TELESCOPIC PIPING SYSTEMS
Henri Deplante, Paris, France, assignor to Avions Marcel Dassault, Saint-Cloud, Hauts-de-Seine, France, a company of France
Filed July 31, 1967, Ser. No. 657,133
Claims priority, application France, Feb. 24, 1967, 96,519
Int. Cl. F16l 39/00
U.S. Cl. 285—136                       5 Claims

ABSTRACT OF THE DISCLOSURE

A piping system comprising a first fixed knuckle, a second knuckle capable of swivelling about an axis of rotation outside the knuckle, and two telescopically arranged pipes one of which terminates in a third knuckle cooperating with the first, and the other of which terminates in a fourth knuckle cooperating with the second. The piping system thus created has advantages over a flexible piping system.

The present invention relates to an articulated telescopic piping system.

In certain instances, it is necessary to incorporate a piping system into a deformable device or machine. Thus, in a variable-geometry aircraft whose wings are capable of swinging in relation to the fuselage about an axis of rotation located in the fuselage, the following three piping systems require to undergo deformation: the piping system linking the engine mounted in the fuselage with a fuel tank carried in a wing; the piping system linking the engine to a fuel pod carried beneath the wing; the piping system carrying the compressed air which is introduced into the fuel tank in order to transfer the fuel from wing to fuselage.

Unlike a flexible piping system, it is an object of the present invention to provide a piping system which can distort without pinching and wherein the pressure loss is less than encountered in known piping systems such as articulated links or flexible systems, in which the pressure loss varies during deformation.

The present invention therefore is directed to the provision of means permitting relative movement between respective pipes in an articulated piping system which is particularly applicable to a variable geometry aircraft. According to the present invention, a pair of telescoping tubes are sealingly connected between a movable pipe and a fixed pipe by means of respective ball and socket joints in a manner whereby the movable pipe may swivel about a fixed axis of rotation which is distal from said movable pipe. A one of the ball and socket joints sealingly connects the end of the telescoping tubes to said fixed pipe, and this ball and socket joint is coaxial with the telescoping tubes. The other ball and socket joint sealingly connects the other end of the telescoping tubes to the movable pipe and the axis of this ball and socket joint extends perpendicularly to the axis of said telescoping tubes.

A further aspect of the invention involves a composite piping arrangement which includes a plurality of movable pipes sealingly connected through corresponding telescoping tubes to respective fixed pipes.

The following description with reference to the accompanying drawings will indicate by way of example how the invention may be carried into effect.

In the drawings:

FIGURE 1 illustrates a plan view of three piping systems in accordance with the invention;

FIGURE 2 is an enlarged view of part of FIGURE 1, illustrating details which do not appear in the latter;

FIGURE 3 is an enlarged section on the line III—III of FIGURE 1;

FIGURE 4 is an enlarged section on the line IV—IV of FIGURE 1.

In the drawings, 13 indicates a substantially vertical axis of rotation in the fuselage of an aircraft whilst 10 indicates a substantially horizontal pipe rigidly attached to the fuselage and for carrying compressed air. This pipe 10 is continued in the form of a knuckled pipe 29, which terminates in a female knuckle 11 (first knuckle). The reference 12 (FIGURE 4) indicates the end of a mobile pipe carried by a rib 19 of a swing-wing on the aircraft, which swing-wing is able to pivot about the axis 13 so that the rib 19 can occupy the position 19x illustrated in chain-dot line. A male knuckle 14 (second knuckle) designed as hereinafter mentioned is screwed on to this pipe extremity 12.

15 and 16 indicate two tubular cylinders. The cylinder 16 can slide in the cylinder 15 in sealed relationship thereto so that together the two cylinders comprise a telescopic tube. The cylinder 16 terminates at one end of the telescopic tube in a male knuckle 17 (third knuckle) which, in association with the first knuckle 11, forms a first sealed ball joint having as its axis the tube axis. At the other end of the telescopic tube, a female knuckle 18 (the fourth knuckle referred to above), which forms a second sealed ball joint in association with the second knuckle 14, is attached to the cylinder 15. When the rib 19 swings about the axis 13 and moves into the position 19x, the cylinder 15 moves into position 15x. During this movement of the cylinder 15 around the cylinder 16, the knuckle 17 turns in the knuckle 11 and the knuckle 14 turns in the knuckle 18.

As is seen in FIG. 1, the telescoping tubes 15, 16 undergo telescopic movement relative to each other as the mobile pipe 12 swivels about axis 13 from the full line position to the dashed line position shown in said FIG. 1. In order to provide for this relative movement, the second ball and socket joint which includes ball and socket members 14 and 18, has been designed as a spherical segment whose axis is perpendicular to the axis of the telescoping tubes and lies in the vertical plane containing the axes of said tubes.

Compressed air, contained in the piping system above described, is operative to pressurise a fuel tank formed in the swing-wing and in a wing pod beneath the wing, in order to transfer fuel to the fuselage and thus to the engine of the aircraft.

The drawings, in addition to this piping system, shows two other piping systems of a similar kind, designed to transfer to the fuselage the fuel contained respectively in the tank and in the pod. The references indicating the elements of these two piping systems are thee same as those for the first piping system, but are followed by the letter *a* in the case of the system associated with the wing tank and by the letter *b* in the case of the system associated with the pod slung beneath the wing. The two mobile pipes 12a and 12b have a common partition 28 and are therefore rigidly linked. It can be seen in the drawings that the two fixed pipes 10a and 10b are not superimposed whilst the telescopic tubes are superimposed, so that the straight line linking the geometric centres of the two first knuckles (one of which is marked 11b) of the two piping systems, is parallel to the axis of rotation 13. The two second knuckles 14a and 14b are both constituted by spherical segments as hereinbefore stated having a common geometrical axis perpendicular to the axes of the two tubes 15a and 15b and extending in the vertical plane containing these two axes.

This arrangement enables the two piping systems to distort simultaneously, the part connected to the wing being able to undergo a relatively large rotational displacement about the vertical axis of rotation whilst also being able to undergo relatively small rotational displacement about instantaneous horizontal geometric axes of rotation.

The assembly of three articulated telescopic piping systems, as illustrated and above described, occupies only a very small amount of space.

It will now be indicated how the sealing between the various elements of the above described piping system is effected. In the following, "Teflon" (trademark) means Teflon containing 5% fibre glass and 5% $MoS_2$; "Perbunan" (trademark) means FP60 Rubber; "Viton" (trademark) means Viton B–70 V–51.

The external cylinder 15 or 15b terminates at the fuselage end in an enlarged section 21 or 21b accommodating a sleeve 20. A carrier ring 22 or 22b, of Teflon is inserted between the internal cylinder 16 or 16b and the sleeve 20 or 20b. This ring carries the radial loads between the two cylinders 15 and 16, or 15b and 16b.

Static seals 23 of Viton and 23b of Perbunan are inserted between the enlarged section 21 or 21b and the sleeve 20 or 20b.

Composite seals 24 and 25 of Viton or 24b and 25b of Perbunan, and a ring 30 or 30b of Teflon, are inserted between the internal cylinder 16 or 16b and the sleeve 20 or 20b.

At the wing end, a seal 27 of Viton or 27a or 27b of Perbunan, is inserted between the second knuckle 14 or 14a or 14b and the fourth knuckle 18 or 18a or 18b, and a seal 26 of Viton or 26a or 26b of Perbunan, is inserted between the fourth knuckle 18 or 18a or 18b and the external cylinder 15, 15a or 15b.

Various modifications of the above described arrangement are possible within the scope of the invention.

I claim:

1. An articulated telescopic piping system, applicable in particular to a variable geometry aircraft, comprising a fixed pipe, a mobile pipe, a pair of telescoping tubes and first and second ball and socket joints, respectively, sealingly interconnecting the opposite ends of said telescoping tubes to said fixed and mobile pipes, respectively, said mobile pipe being mounted to swivel about a fixed axis of rotation which is distal from said mobile pipe, said first ball and socket joint being coaxial with the telescoping tubes and said second ball and socket joint having its axis extending substantially perpendicularly to the axis of said telescoping tubes.

2. The piping system of claim 6, wherein the axis of the second ball and socket joint is in a plane which includes the axis of said telescoping tubes and which extends parallel to said fixed axis of rotation.

3. An articulated telescopic piping system as defined in claim 1, including another fixed pipe, another mobile pipe rigidly connected to the first mentioned mobile pipe, a second pair of telescoping tubes and another first and another second ball and socket joint respectively, sealingly interconnecting the opposite ends of said other telescoping tubes respectively to said other fixed and mobile pipes said other first ball and socket joint being coaxial with said other telescoping tubes and said other second ball and socket joint having its axis extending perpendicularly to the axis of said other telescoping tubes.

4. The piping system of claim 3, wherein the geometric centers of each of said first ball and socket joints lie along a straight line which extends parallel to said fixed axis of rotation.

5. The piping system of claim 3, wherein the geometric centers of said second ball and socket joints lie along a straight line which extends perpendicularly to said mobile pipes in a plane containing the axis of said mobile pipes and which plane extends parallel to said fixed axis of rotation.

References Cited

FOREIGN PATENTS 1,020,699   2/1966   Great Britain.
1,060,532   3/1967   Great Britain.

OTHER REFERENCES

Dumont Engineering Co., Bulletin 590, which was received in the Patent Office on Aug. 24, 1964, published by Dumont Engineering Co., a subsidiary of Dumont Aviation Associates, 1401 Freeman Ave., Long Beach, Calif.

DAVID J. WILLIAMOWSKY, Primary Examiner

WAYNE L. SHEDD, Assistant Examiner

U.S. Cl. X.R.

285—173, 165, 166, 260, 302